United States Patent [19]
Kaneko et al.

[11] Patent Number: 5,521,580
[45] Date of Patent: May 28, 1996

[54] DANGER AVOIDANCE SYSTEM FOR A VEHICLE

[75] Inventors: Kazuma Kaneko; Mitsuo Shimotani; Yoshiharu Morihiro; Norihiro Tamiya; Yuichi Fudewaki; Noriyuki Inoue; Minoru Nishida; Yoshihiro Utsui; Shouichi Washino, all of Hyogo, Japan

[73] Assignee: Mitsubishi Denki Kabushiki Kaisha, Tokyo, Japan

[21] Appl. No.: 396,268

[22] Filed: Feb. 28, 1995

Related U.S. Application Data

[63] Continuation of Ser. No. 141,178, Oct. 21, 1993, abandoned.

[30] Foreign Application Priority Data

Nov. 13, 1992 [JP] Japan .................... 4-327564

[51] Int. Cl.⁶ ........................................ B60Q 1/00
[52] U.S. Cl. .................. 340/439; 180/272; 340/438; 364/424.04
[58] Field of Search ............... 340/435, 438, 340/439, 460, 459, 905, 575, 576; 180/272; 364/424.04

[56] References Cited

U.S. PATENT DOCUMENTS

| | | | |
|---|---|---|---|
| 3,310,662 | 3/1967 | Greenshields | 340/439 |
| 3,775,743 | 11/1973 | Carter | 340/905 |
| 4,168,499 | 9/1979 | Matsumura et al. | 180/272 |
| 4,196,412 | 4/1980 | Sluis et al. | 340/905 |
| 4,492,952 | 1/1985 | Miller | 340/439 |
| 4,500,868 | 2/1985 | Tokitsu et al. | 364/424.04 |
| 4,594,583 | 6/1986 | Seko et al. | 340/576 |
| 5,057,834 | 10/1991 | Nordstrom | 340/576 |
| 5,173,856 | 12/1992 | Purnell et al. | 340/439 |
| 5,243,339 | 9/1993 | Graham et al. | 340/945 |

FOREIGN PATENT DOCUMENTS

| | | |
|---|---|---|
| 2509354 | 12/1977 | Germany . |
| 3222263 | 2/1983 | Germany . |
| 3637165 | 5/1988 | Germany . |
| 3803916 | 8/1989 | Germany . |
| 3810840 | 11/1989 | Germany . |

*Primary Examiner*—Brent A. Swarthout
*Attorney, Agent, or Firm*—Wolf, Greenfield & Sacks

[57] ABSTRACT

The present invention relates to a danger avoidance system capable of avoiding the collision of a vehicle against obstacles and of reducing the effect of collision on a vehicle. A traveling condition deciding unit decides whether or not the vehicle is in a dangerous traveling condition on the basis of the respective outputs of a vehicle monitoring system and an ambient condition monitoring system. A danger recognition confirming unit decides whether or not the driver is aware of the dangerous traveling condition on the basis of the respective outputs of a driver monitoring system, the ambient condition monitoring system and the vehicle monitoring system. When the traveling condition deciding unit decides that the vehicle is in the dangerous traveling condition, measures to avoid danger or to reduce the effect of collision on the vehicle are taken only when the driver is not aware of the dangerous traveling condition. Therefore, a danger avoidance effecting unit does not execute the measures to avoid danger or to reduce the effect of collision on the vehicle when the driver is aware of the dangerous traveling condition.

11 Claims, 8 Drawing Sheets

FIG. 5

| TRAVELING SPEED (Km/hr) | FREE RUNNING DISTANCE (m) | BRAKING DISTANCE (m) | STOPPING DISTANCE (m) | BRAKING TIME (sec) | STOPPING TIME (sec) |
|---|---|---|---|---|---|
| 150 | 41.7 | 177.2 | 218.9 | 8.5 | 9.5 |
| 125 | 34.7 | 123.0 | 157.7 | 7.1 | 8.1 |
| 110 | 30.6 | 95.3 | 125.9 | 6.2 | 7.2 |
| 100 | 27.8 | 78.7 | 106.5 | 5.7 | 6.7 |
| 90 | 25.0 | 63.8 | 88.8 | 5.1 | 6.1 |
| 80 | 22.2 | 50.4 | 72.6 | 4.5 | 5.5 |
| 70 | 19.4 | 38.4 | 58.0 | 4.0 | 5.0 |
| 60 | 16.7 | 28.3 | 45.0 | 3.4 | 4.4 |
| 50 | 13.9 | 19.7 | 33.6 | 2.8 | 3.8 |
| 40 | 11.1 | 12.6 | 23.7 | 2.3 | 3.3 |
| 30 | 8.3 | 7.1 | 15.4 | 1.7 | 2.7 |
| 20 | 5.6 | 3.1 | 8.7 | 1.1 | 2.1 |
| 10 | 2.8 | 0.8 | 3.6 | 0.6 | 1.6 |
| 5 | 1.4 | 0.2 | 1.6 | 0.3 | 1.3 |

DANGER AVOIDANCE SYSTEM FOR A VEHICLE

This application is a continuation of application Ser. No. 08/141,178, filed on Oct. 21, 1993, now abandoned.

BACKGROUND OF THE INVENTION

1. Field of the Invention

The present invention relates to a danger avoidance system capable of avoiding the collision of a vehicle against obstacles and of reducing the effect of collision on a vehicle.

2. Description of the Prior Art

FIG. 1 is a block diagram of a danger avoidance system for a vehicle disclosed in Japanese Patent Laid-open (Kokai) No. 63-222939. Referring to FIG. 1, an ambient condition monitoring system 20 for monitoring the ambient conditions comprises a traveling lane detector 21 for detecting a lane in which the vehicle is traveling, an obstacle detector 22 for detecting obstacles in the sight of a driver, another obstacle detector 23 for detecting obstacles out of the sight of the driver, a signal light detector 24 for sensing signal lights, and a road surface condition detector 25 for detecting the surface conditions of the road. A driver monitoring system 40 for monitoring the mental and physical condition of the driver including his behavior comprises a line-of-sight detector 41 for detecting the driver's line of sight, a blink detector 42 for detecting the blinking of the driver, a blood pressure sensor 43 for measuring the driver's blood pressure, a pulse sensor 44 for determining the driver's pulse count, and a temperature sensor 45 for measuring the driver's body temperature. A safety condition determining unit 100 determines conditions for safe traveling on the basis of the output signals of the ambient condition monitoring system 20 and the driver monitoring system 40.

A vehicle condition monitoring system 10 for monitoring the behavior of the vehicle comprises a traveling speed sensor 11 for sensing the traveling speed of the vehicle, an acceleration sensor 12 for sensing the acceleration of the vehicle, an angular velocity sensor 13 for sensing the angular velocity of the vehicle, an accelerator pedal sensor 14 for sensing the position of the accelerator pedal, and a brake pedal sensor 15 for sensing the position of the brake pedal. A data comparison unit 110 determines the traveling behavior of the vehicle on the basis of the vehicle condition monitoring system 10 and compares the data representing the traveling behavior of the vehicle with safety conditions determined by the safety condition determining unit 100. A danger avoidance effecting system 60 for notifying the driver of danger and effects operations for avoiding danger or reducing the damage that will result from the danger comprises an audio device 61 which generates an audio warning, a warning display 62, the brake pedal 63 of the vehicle, the steering wheel 64 of the vehicle, and the accelerator pedal 65 of the vehicle.

The operation of the danger avoidance system will be described hereinafter with reference to a flow chart shown in FIG. 2. Suppose that the red signal light of a traffic signal installed at a crossing situated ahead is on and the driver has not recognized the red signal light through inattention. The signal light detector 24 of the ambient condition monitoring system 20 senses the red signal light on the traffic signal at the crossing situated 100 m ahead and the ambient condition monitoring system 20 provides a red light signal indicating that the red signal light is on. The line-of-sight detector 41 of the driver monitoring system 40 detects the driver's line of sight and the driver monitoring systems provides an inattention signal indicating that the driver's eyes are off the traffic signal. In step ST11, the red light signal and the inattention signal are transmitted through an input interface to the safety condition determining unit 100. In step ST12, the safety condition determining unit 100 determines safety conditions "Watch ahead and decelerate" for safety traveling on the basis of the red light signal and the inattention signal.

Meanwhile, the vehicle condition monitoring system 10 provides a traveling speed signal representing a traveling speed of 50 km/hr, an acceleration signal representing an acceleration of 0, and an angular velocity signal representing an angular velocity of 0 detected respectively by the traveling speed sensor 11, the acceleration pedal sensor 12 and the angular velocity sensor 13. In step ST13, these output signals of the vehicle condition monitoring system 10 are given through the input interface to the data comparison unit 110. Then, in step ST14, the data comparison unit 110 determines the traveling condition "Straight traveling at 50 km/hr" of the vehicle on the basis of the vehicle condition monitoring system 10. In step ST15, the data comparison unit 110 compares the safety conditions "Watch ahead and decelerate" determined in step ST12 and the traveling conditions "Straight traveling at 50 km/hr" determined in step ST14.

In this case, since the traveling mode of the vehicle does not meet safety traveling conditions, the data comparison unit 110 decides that the traveling mode of the vehicle is dangerous and gives instructions for danger avoidance to the danger avoidance effecting system 60. Then, the danger avoidance effecting system 60 drives the audio device 61 and the warning display 62 in step ST16 to urge the driver to take measures for avoiding danger by giving an audio warning "The red signal light is on. Decelerate immediately." by the audio device 61 and visually displaying a warning to that effect on the warning display 62.

Suppose that the red signal light of a traffic signal installed at a crossing situated ahead is on, the driver has recognized the red signal light, and the driver's foot is about to shift from the accelerator pedal to the brake pedal to stop the vehicle. The ambient condition monitoring system 20 provides a red light signal indicating that the red signal light of the traffic signal at a crossing situated 100 m ahead, and the driver monitoring system 40 provides a normal state signal indicating that the driver is neither looking aside nor dozing. The red light signal and the normal state signal are transmitted through the input interface to the safety condition determining unit 100 in step ST11. In step ST12, the safety condition determining unit 100 determines a safety condition "Decelerate" on the basis of the red light signal provided by the ambient condition monitoring system 20 and indicating that the red signal light of the traffic signal at the crossing situated 100 m ahead is on, and the normal state signal provided by the driver monitoring system 40 and indicating that the driver is neither looking aside nor dozing.

Meanwhile, the vehicle condition monitoring system 10 provides a traveling speed signal representing a traveling speed of 50 km/hr, an acceleration signal representing an acceleration of 0, and an angular velocity signal representing an angular velocity of 0. Then, in step ST13, the data comparison unit 110 receives these output signals of the vehicle monitoring system 10 through the input interface. In step ST14, the data comparison unit 110 determines a traveling condition "Straight traveling at 50 km/hr" of the vehicle on the basis of the output signals of the vehicle monitoring system 10. In step ST15, the data comparison unit 110 compares the safety condition "Decelerate" determined in step ST12 and the traveling mode "Straight traveling at 50 km/hr" of the vehicle detected in step ST14, decides that the traveling mode of the vehicle is dangerous, and gives instructions for danger avoidance to the danger avoidance effecting system 60. Then, in step ST16, the danger avoidance effecting system 60 drives the audio device 61 and the warning display 62 according to the instructions given thereto by the data comparison unit 110 to give an audio warning "The red signal light is on. Stop the vehicle immediately." by the audio device 61 and to display to that effect on the warning display 62 so that the safety traveling conditions are secured.

Suppose that the driver is looking aside while the vehicle is traveling on a clear, straight road. The ambient condition monitoring system 20 provides signals indicating that the road running ahead is straight and clear, and the driver monitoring system 40 provides a signal indicating that the driver is looking aside. In step ST11, the safety condition determining unit 100 receives these output signals of the ambient condition monitoring system 20 and the driver monitoring system 40 through the input interface. In step ST12, the safety condition determining unit 100 decides a safety condition "Watch ahead" on the basis of the output signal of the ambient condition monitoring system 20 indicating that the road is straight and clear, and the output signal of the driver monitoring system 40 indicating that the driver is looking aside, because, although there is no risk of collision, taking the driver's eyes off the road is dangerous.

The vehicle condition monitoring system 10 provides signals representing the traveling speed, the acceleration and the angular velocity of the vehicle. In step ST13, the data comparison unit 110 receives these output signals of the vehicle condition monitoring system 10 through the input interface. In step ST14, the data comparison unit 110 determines the traveling mode of the vehicle on the basis of the output signals of the vehicle condition monitoring system 10. In step ST15, the data comparison unit 110 compares the safety condition "Watch ahead" determined in step ST12 and the traveling mode of the vehicle determined in step ST14, decides that the traveling mode is dangerous, and give instructions for danger avoidance to the danger avoidance effecting system 60. Then, in step ST16, the danger avoidance effecting system 60 drives the audio device 61 and the warning display 62 according to the instruction given thereto by the data comparison unit 110 to give an audio warning "Watch ahead." and to display a visual warning to that effect on the warning display 62 so that the safety conditions are secured.

However, the known danger avoidance system thus constructed gives a warning even if the driver has recognized dangerous conditions and the driver is taking measures to avoid a traffic accident, or even if the driver looks aside intentionally when there is not any danger. Such a mode of operation of the danger avoidance system is annoying.

SUMMARY OF THE INVENTION

Accordingly, it is an object of the present invention to provide a danger avoidance system which does not effect measures to avoid danger or reduce risks of danger even if the traveling mode of the vehicle is dangerous, provided that the driver is aware of the dangerous traveling mode of the vehicle.

A danger avoidance system for a vehicle, in a first aspect of the present invention comprises a traveling condition deciding unit for deciding whether or not the vehicle is in a dangerous traveling mode, and a danger recognition confirming unit for confirming whether or not the driver is aware of the dangerous traveling mode and for inhibiting the operation of a danger avoidance effecting system when it is confirmed that the driver is aware of the dangerous traveling mode.

The danger recognition confirming unit is allowed to function to avoid a traffic accident or to reduce risks of meeting a traffic accident only when the traveling condition deciding unit decides that the vehicle is in a dangerous traveling mode and the danger recognition confirming system decides that the driver is not aware of the dangerous traveling mode.

Accordingly, the danger avoidance system do not operate to avoid a traffic accident or to reduce risks of meeting a traffic accident when it is confirmed that the driver is aware of the dangerous traveling mode.

In a danger avoidance system for a vehicle, in a second aspect of the present invention, a traveling condition deciding unit decides whether or not the vehicle is in a dangerous traveling mode on the basis of output signals of a vehicle condition monitoring system and an ambient condition monitoring system, and a danger recognition confirming unit confirms whether or not the driver is aware of a dangerous traveling mode on the basis of the output signals of a driver monitoring system.

In a danger avoidance system for a vehicle, in a third aspect of the present invention, a danger recognition confirming unit decides whether or not the driver is aware of a dangerous traveling mode on the basis of the output signals of a driver monitoring system and an ambient condition monitoring system.

The accuracy of the decision of the danger recognition confirming unit on whether or not the driver is aware of the dangerous traveling mode is improved by the use of the output signals of the vehicle monitoring system in addition to the output signals of the driver monitoring system.

In a danger avoidance system for a vehicle, in a fourth aspect of the present invention, a danger recognition confirming unit decides whether or not the driver is aware of a dangerous traveling mode on the basis of the output signals of a driver monitoring system, an ambient condition monitoring system and a vehicle condition monitoring system.

The accuracy of the decision of the danger recognition confirming unit on whether or not the driver is aware of the dangerous traveling mode is improved by the use of the output signals of the vehicle condition monitoring system and the ambient condition monitoring system in addition to the output signals of the driver monitoring system.

In a danger avoidance system for a vehicle, in a fifth aspect of the present invention is provided with a vehicle condition data storage unit for storing the output signals of a vehicle monitoring system for a predetermined time.

Since the vehicle condition data storage unit holds the output signals of the vehicle monitoring system for a predetermined time, an ambient condition monitoring system infers the ambient condition from the behavior of the vehicle in the predetermined time and selectively determines an ambient area to be monitored.

In a danger avoidance system for a vehicle, in a sixth aspect of the present invention, a data storage unit stores the respective output signals of a vehicle condition monitoring system, an ambient condition monitoring system, a traveling condition deciding unit, a driver monitoring system and a danger recognition confirming unit in time series.

The respective output signals of the vehicle condition monitoring system, the ambient condition monitoring system, the traveling condition deciding unit, the driver monitoring system and the danger recognition confirming unit stored in time series in the data storage unit enable the realization of drive simulators or an operations control apparatus.

BRIEF DESCRIPTION OF THE DRAWINGS

The above and other objects, features and advantages of the present invention will become more apparent from the following description taken in connection with the accompanying drawings, in which:

FIG. 5 is a table showing the relation between traveling speed and stopping time;

DETAILED DESCRIPTION OF THE PREFERRED EMBODIMENTS

First Embodiment

Figure 1:
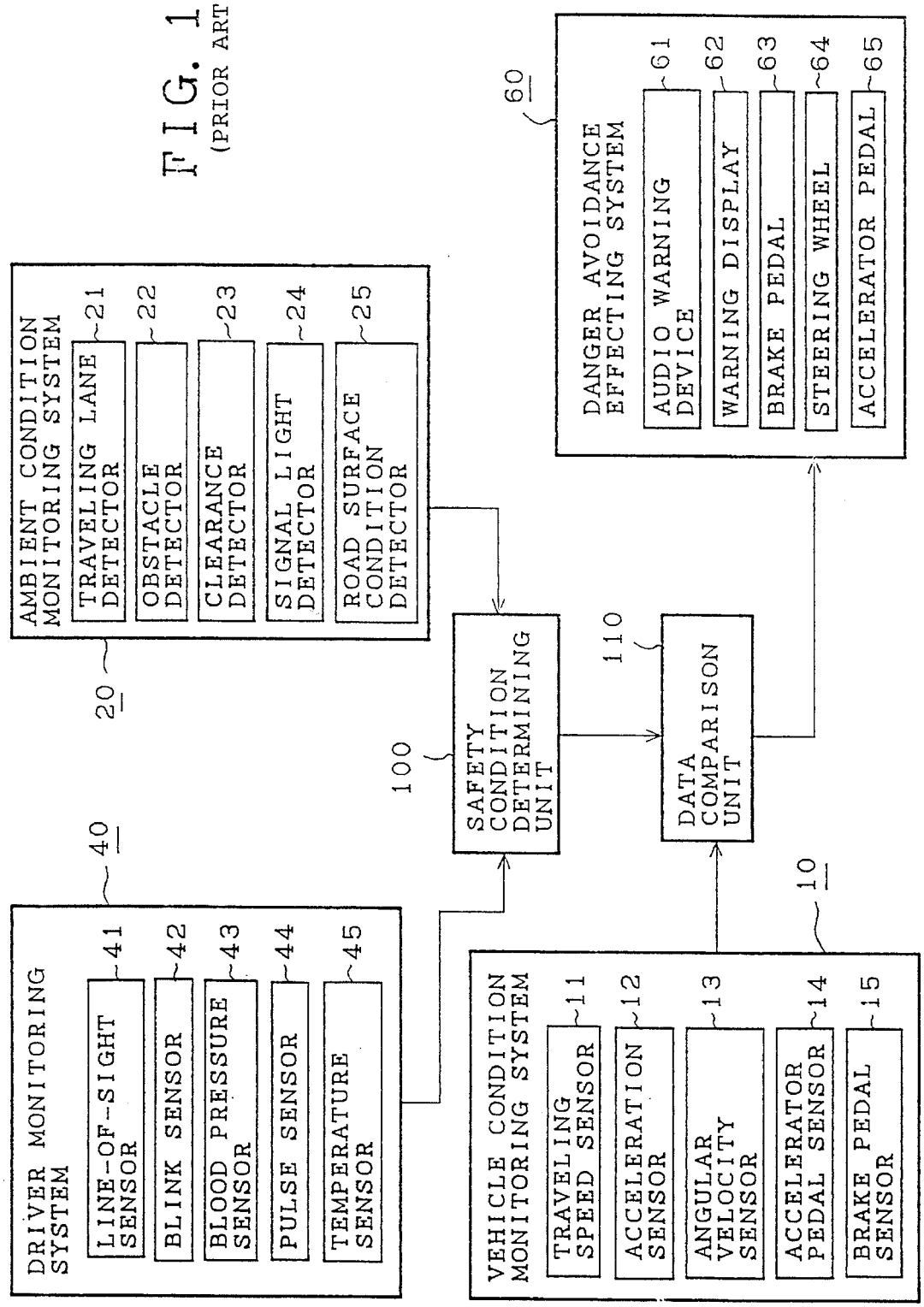
FIG. 1 is a block diagram of a known danger avoidance system for a vehicle.

A danger avoidance system for a vehicle, in a first embodiment according to the present invention will be described with reference to FIG. 3, in which parts like or corresponding to those previously described with reference to FIG. 1 are denoted by the same reference characters and the description thereof will be omitted.

Figure 3:
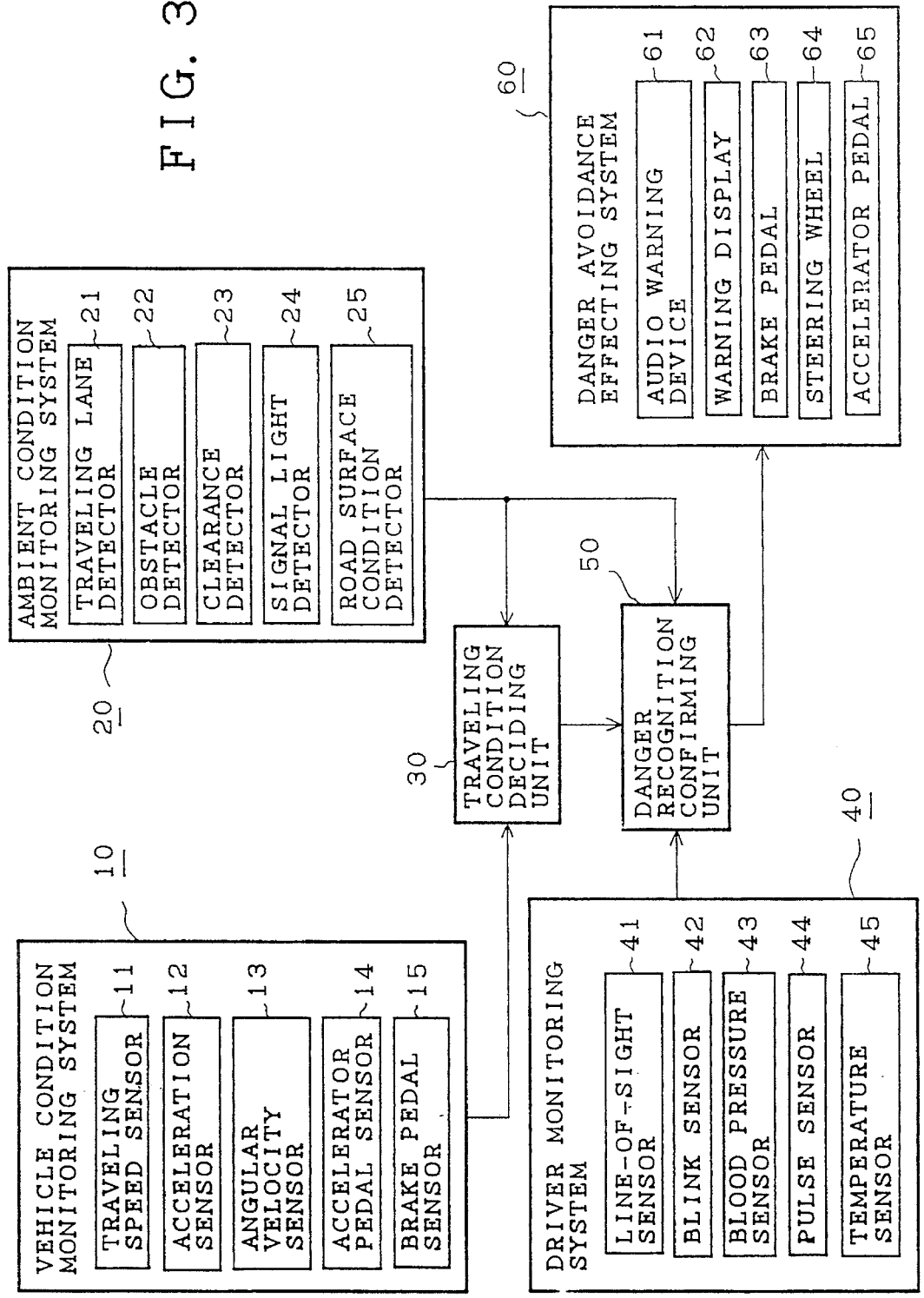
FIG. 3 is a block diagram of a danger avoidance system for a vehicle, in a first embodiment according to the present invention.

Referring to FIG. 3, the danger avoidance system comprises: a vehicle condition monitoring system 10 comprising a traveling speed sensor 11, an acceleration sensor 12, an angular velocity sensor 13, an accelerator pedal sensor 14 and a brake pedal sensor 15; an ambient condition monitoring system 20 comprising a traveling lane detector 21, an obstacle detector 22, a clearance detector 23, a signal light detector 24 and a road surface condition detector 25; a traveling condition deciding unit 30; a driver monitoring system 40 comprising a line-of-sight detector 41, a blink detector 42, a blood pressure sensor 43, a pulse sensor 44 and a temperature sensor 45; a danger recognition confirming unit 50; a danger avoidance effecting system 60 comprising an audio warning device 61, a warning display 62, the brake pedal 63 of the vehicle, the steering wheel 64 of the vehicle and the accelerator pedal 65 of the vehicle; a safety condition determining unit 100; and a data comparison unit 110.

The traveling condition deciding unit 30 decides whether or not the vehicle is in a dangerous traveling mode on the basis of the output signals of the vehicle condition monitoring system 10 and those of the ambient condition monitoring system 20. The danger recognition confirming unit 50 decides whether or not the driver is aware of dangerous traveling mode on the basis of the output signals of the ambient condition monitoring system 20 and those of the driver monitoring system 40 when the traveling condition deciding unit 30 decides that the vehicle is in a dangerous traveling mode.

Figure 4:
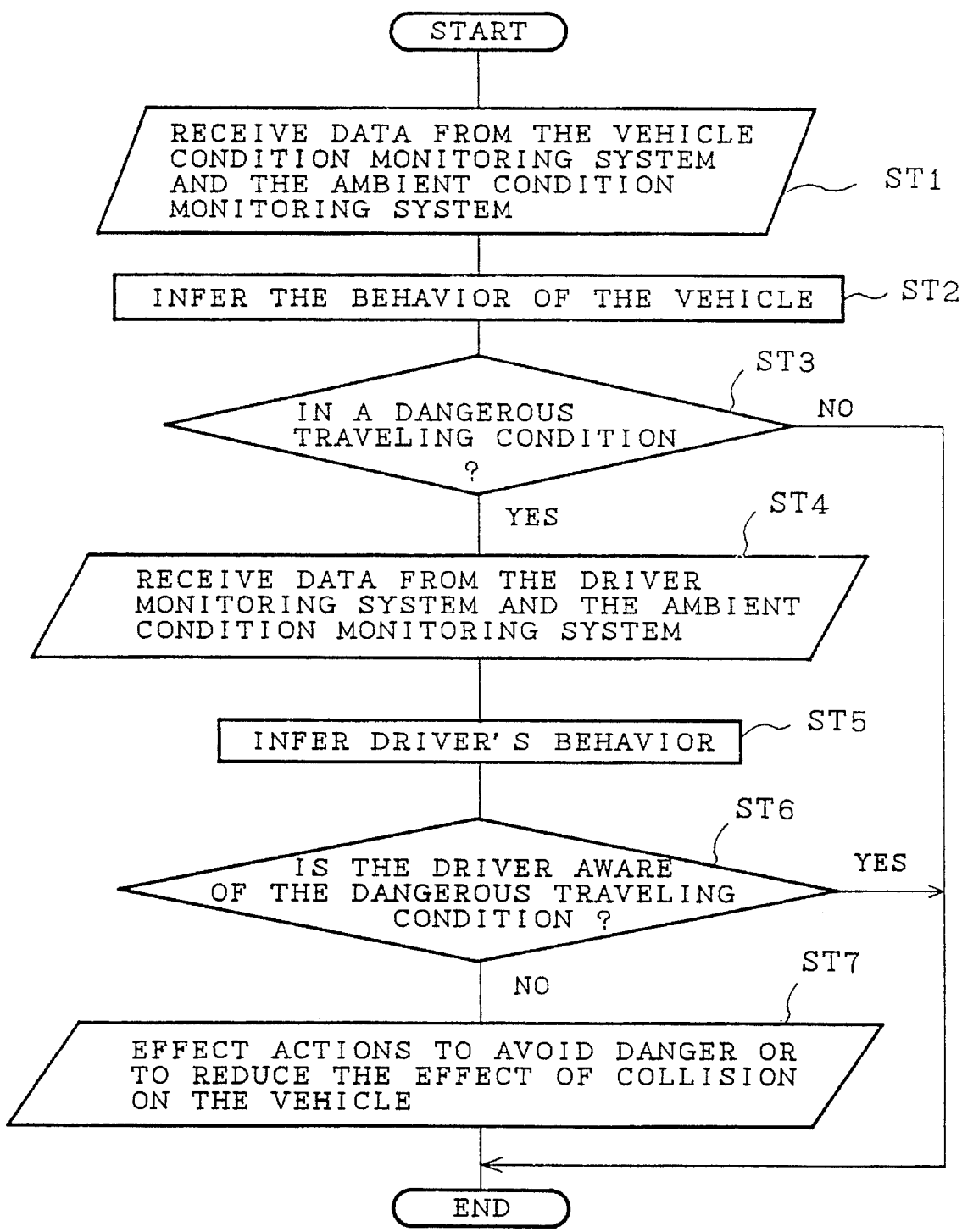
FIG. 4 is a flow chart showing steps of a danger avoidance procedure to be executed by the danger avoidance system of FIG. 3.

A mode of operation of the danger avoidance system will be described hereinafter with reference to FIG. 4 on an assumption that the red signal light of a traffic signal installed at a crossing situated ahead of the vehicle is on, the driver is looking aside, the driver's eyes are off the red signal light through inattention, and the vehicle is traveling at a constant traveling speed of 50 km/hr (the acceleration is zero) and at an angular velocity of 0.

The traveling speed sensor 11, the acceleration sensor 12 and the angular velocity sensor 13 of the vehicle monitoring system 10 provide signals representing a traveling speed of 50 km/hr, an acceleration of 0 and an angular velocity of 0, respectively. The signal light detector 24 of the ambient condition monitoring system 20 detects the red signal light of the traffic signal installed at the crossing situated 100 m ahead of the vehicle and provides a red signal light detection signal indicating that the red signal light is on and a distance signal indicating the position of the traffic signal. These output signals of the vehicle condition monitoring system 10 and the ambient condition monitoring system 20 are given through an input interface to the traveling mode deciding unit 30 in step ST1. In step ST2, the traveling condition deciding unit 30 infers, from the output signals of the vehicle condition monitoring system 10 and the ambient condition monitoring system 20, that "The vehicle will enter the crossing with the red signal light banning the vehicle from entering at a traveling speed of 50 km/hr in about 7 sec provided that the present traveling mode is maintained. Judging from the decelerating ability and the traveling speed of the vehicle, deceleration must be started in about 4.4 sec. Judging from the time required for providing a warning message and the reaction time required for the driver to react to the warning, the float is about 1 sec."

The relation between the traveling speed and the stopping distance will be described. The stopping distance is equal to the sum of a distance through which the vehicle travels in the reaction time required for the driver to react to the warning and a braking distance through which the vehicle travels before stopping after the deceleration of the vehicle is started. The traveling speed can be expressed in a unit of m/sec by using an expression:

$$v_1 = V/3.6 \quad (1)$$

where $v_1$ is traveling speed in m/sec and V is traveling speed in km/hr.

Since the reaction time is about 1 sec, $$S = (V/3.6)^2 / (2 \times 9.8 \times \alpha) \quad (2)$$

where S (m) is braking distance, $\alpha$ is the ratio of deceleration to the gravitational acceleration.

Therefore, $$t_s = V/(3.6 \times 9.8 \times \alpha) \quad (3)$$

where $t_s$ (sec) is braking time when the vehicle will travel before stopping after the deceleration of the vehicle has been started.

Thus, the stopping time is equal to the sum of the reaction time required for the driver to react to the warning and the braking time. Ordinarily, the ratio $\alpha$, i.e., the ratio of the deceleration to the gravitational acceleration, is in the range of 0.5 to 0.9 on asphalted roads. FIG. 5 shows the results of calculation by using the expressions (1), (2) and (3) on condition that $\alpha=0.5$ and the reaction time is 1 sec. In FIG. 5, free running distance is the distance traveled by the vehicle in the reaction time.

In step ST3, the traveling condition deciding unit 30 decides whether or not the vehicle is in a dangerous traveling mode on the basis of the behavior of the vehicle inferred in step ST2. Under the foregoing conditions, the traveling condition deciding unit 30 decides that the vehicle is in danger of entering the crossing with the red signal light banning the vehicle from entering and gives the danger recognition confirming unit 50 an instruction requesting the detection of the driver's behavior. Upon the reception of the instruction from the traveling condition deciding unit 30, the danger recognition confirming unit 50 receives the output signals of the ambient condition monitoring system 20 and the driver monitoring system 40 through the input interface in step ST4.

Figure 2:
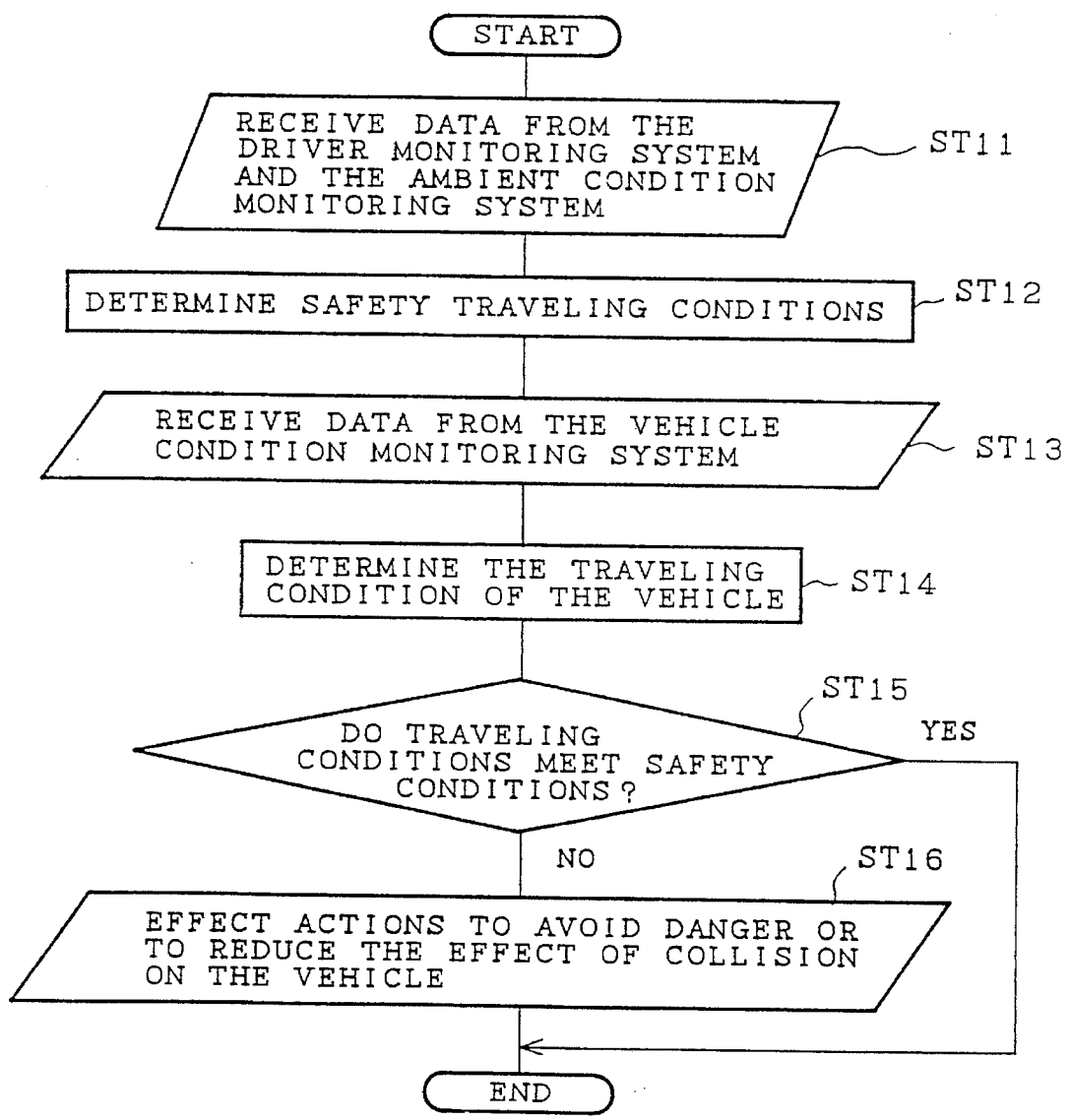
FIG. 2 is a flow chart of a danger avoidance procedure to be executed by the danger avoidance system of FIG. 1.

In step ST5, the danger recognition confirming unit 50 determines the driver's behavior on the basis of the output signals of the ambient condition monitoring system 20 and the driver monitoring system 40. The danger recognition confirming unit 50 determines that the driver is looking aside from a signal indicating the movement of the driver's line of sight provided by the driver monitoring system 40 and a signal indicating the position of the traffic signal provided by the ambient condition monitoring system 20 and that the driver's blood pressure, the driver's pulse count and the driver's body temperature are constant from signals indicating the driver's blood pressure, the driver's pulse count and the driver's body temperature. In step ST6, the danger recognition confirming unit 50 decides on the basis of the decision made in step ST5 that the driver is not aware of the dangerous traveling mode, because the driver is looking aside and the driver's blood pressure, pulse count and body temperature are constant, and gives an instruction requesting the danger avoidance effecting system 60 to take measures to avoid danger. In step ST7, the danger avoidance effecting system 60 executes the same procedure as that previously described with reference to FIG. 2 to warn the driver.

A mode of operation of the danger avoidance system will be described on condition that the red signal light of a traffic signal installed at a crossing situated ahead of the vehicle is on, the driver has recognized the red signal light, the driver is about to shift the foot from the accelerator pedal to the brake pedal and the vehicle is traveling at a constant traveling speed of 50 km/hr (acceleration is zero) and an angular velocity of 0. The vehicle monitoring system 10 provides signals indicating a traveling speed of 50 km/hr, an acceleration of 0 and an angular velocity of 0, and the ambient condition monitoring system 20 provides signals indicating that the red signal light of the traffic signal at the crossing situated 100 m ahead is on and the position of the traffic signal. In step ST1, the traveling mode deciding unit 30 receives the output signals of the vehicle monitoring system 10 and the ambient condition monitoring system 20 through the input interface. In step ST2, the traveling mode deciding unit 30 infers the behavior of the vehicle that "The vehicle will enter the crossing with the red signal light banning the vehicle from entering at a traveling speed of 50 km/hr in about 7.2 sec provided that the present traveling mode is maintained. Judging from the decelerating ability and the traveling speed of the vehicle, deceleration must be started in about 4.4 sec. Judging from the time required for providing a warning message and the reaction time necessary for the driver to react the warning, the float is about 1 sec."

Then, in step ST3, the traveling condition deciding unit 30 decides, on the basis of the behavior of the vehicle inferred in step ST2, that the vehicle is in danger of entering the crossing with the red signal light banning the vehicle from entering and gives an instruction requesting the detection of the driver's behavior to the danger recognition confirming unit 50. Upon the reception of the instruction from the traveling condition deciding unit 30, the danger recognition confirming unit 50 receives the output signals of the ambient condition monitoring system 20 and the driver monitoring system 40 through the input interface in step ST4. In step ST5, the danger recognition confirming unit 50 determines the driver's behavior on the basis of the output signals of the ambient condition monitoring system 20 and the driver monitoring system 40. The danger recognition confirming unit 50 determines from the movement of the driver's line of sight and the position of the traffic signal, that the driver is watching the traffic signal and the traffic condition around the traffic signal and determines, from the changing driver's blood pressure, pulse count and body temperature, that the driver is aware of the dangerous traveling mode, and then the procedure is ended. In this case, no warning is given.

A mode of operation of the danger avoidance system will be described on condition that the vehicle is traveling on a clear straight road, the driver is looking aside, and the vehicle is traveling at a constant traveling speed of 50 km/hr (acceleration is zero) and an angular velocity of 0. The vehicle condition monitoring system 10 provides signals indicating a traveling speed of 50 km/hr, an acceleration of 0 and an angular velocity of 0, and the ambient condition monitoring system 20 provides signals indicating that the road running ahead is straight and the road is clear, In step ST1, the traveling mode deciding unit 30 receives the output signals of the vehicle condition monitoring system 10 and the ambient condition monitoring system 20 through the input interface. In step ST2, the traveling mode deciding unit 30 infers, from the output signals of the vehicle condition monitoring system 10 and the ambient condition monitoring system 20, that "There is no possibility of collision provided that the present traveling mode is maintained." In step ST3, it is decided, from the behavior of the vehicle inferred in step ST2, that the vehicle is traveling in a safe traveling mode, and the procedure is ended. In this case, no warning is given.

Although the danger recognition confirming unit 50 of the danger avoidance system in the first embodiment uses both the output signals of the ambient condition monitoring system 20 and those of the driver monitoring system 40 for accurate decision when deciding whether or not the driver is aware of the dangerous traveling mode, the danger recognition confirming unit 50 may make the decision on the basis of only the output signals of the driver monitoring system 40 if a decision in a lower accuracy entails no problem.

Second Embodiment

Figure 6:
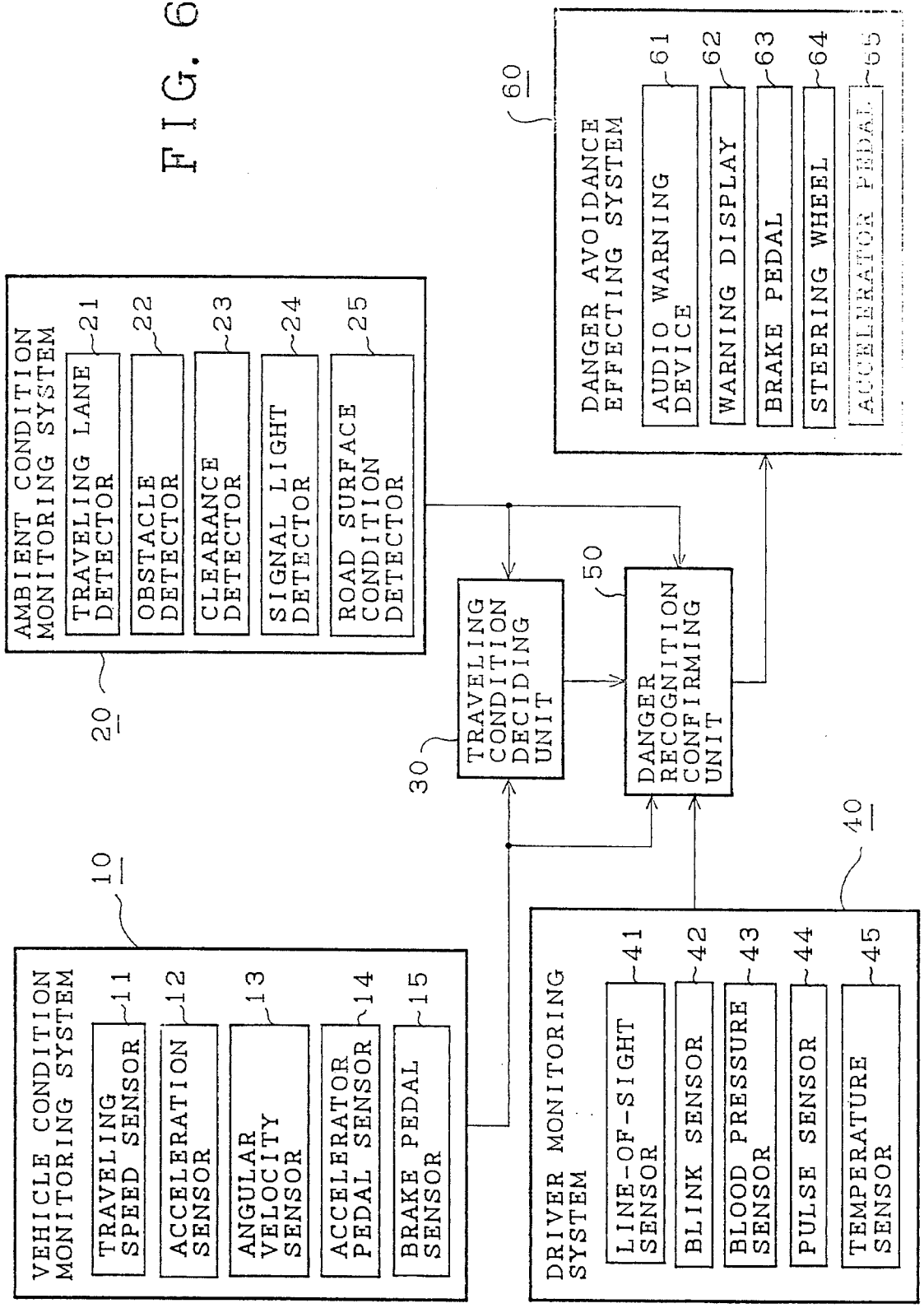
FIG. 6 is a block diagram of a danger avoidance system for a vehicle, in a second embodiment according to the present invention.

A danger avoidance system in a second embodiment according to the present invention will be described with reference to FIG. 6, in which parts like or corresponding to those previously described with reference to FIG. 1 are denoted by the same reference characters and the description thereof will be omitted. As shown in FIG. 6, the danger avoidance system in the second embodiment, which is substantially the same in configuration and function as the danger avoidance system in the first embodiment, has a danger recognition confirming unit 50 which receives both the output signals of a vehicle condition monitoring system 10 and those of an ambient condition monitoring system 20; that is, the danger recognition confirming unit 50 uses the output signals of the vehicle condition monitoring system 10 in addition to those of the ambient condition monitoring system 20 and a driver monitoring system 40 when determining whether or not the driver is aware of the dangerous traveling mode. For example, when the driver's blood pressure, pulse count and body temperature are constant because the driver is dozing and the respective positions of the accelerator pedal and the brake pedal are constant, the danger recognition confirming unit 50 decides that the driver is not aware of the dangerous traveling mode, When the driver is neither dozing nor looking aside, i.e., when the driver's blood pressure, pulse count and body temperature, and the respective positions of the accelerator pedal and the brake pedal are varying, the danger recognition confirming unit 50 decides that the driver is aware of the dangerous traveling mode. The use of signals indicating the change of the traveling mode of the vehicle in addition to the signals indicating the driver's behavior improves the accuracy of the decision on whether or not the driver is aware of the dangerous traveling mode.

Third Embodiment

Figure 7:
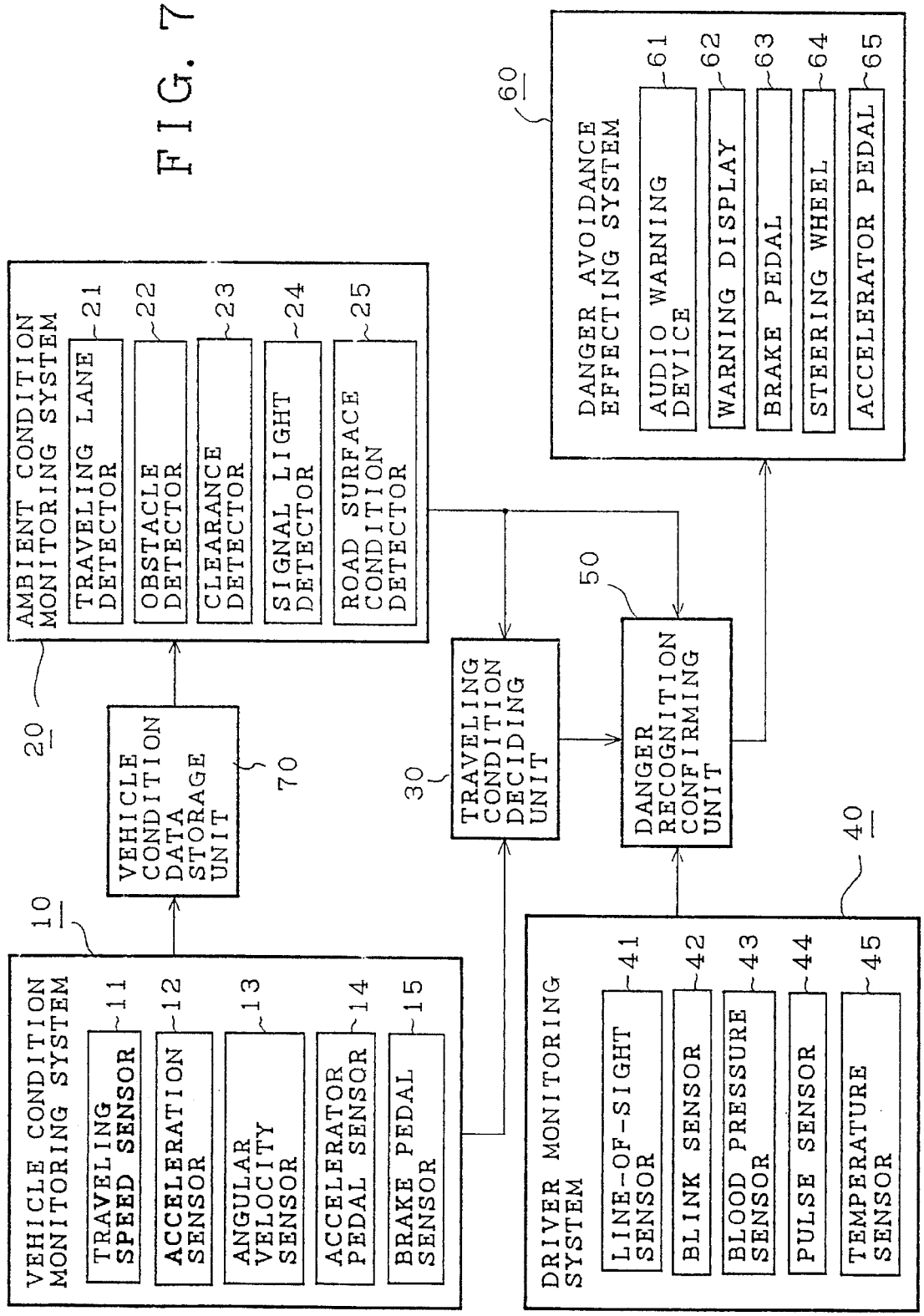
FIG. 7 is a block diagram of a danger avoidance system for a vehicle, in a third embodiment according to the present invention.

A danger avoidance system in a third embodiment according to the present invention will be described with reference to FIG. 7, in which parts like or corresponding to those previously described with reference to FIG. 3 are denoted by the same reference characters and the description thereof will be omitted. As shown in FIG. 7, the danger avoidance system in the third embodiment is substantially the same in configuration and function as the danger avoidance system in the first embodiment, except that the danger avoidance system in the third embodiment is provided with a vehicle condition data storage unit 70 capable of storing data provided by a vehicle condition monitoring system 10 for a predetermined time and of giving the same to an ambient condition monitoring system 20.

In operation, the ambient condition monitoring system 20 infers the condition of the ambience from the data representing the traveling behavior of the vehicle in the preceding predetermined time and stored in the vehicle condition data storage unit 70. For example, when steering angle is varying in a narrow range, the position of the accelerator pedal is varying in a narrow range and the position of the brake pedal is varying in a narrow range, the ambient condition monitoring system 20 infers that the vehicle is traveling on an expressway. When steering angle is varying in a wide range, the position of the accelerator pedal is varying in a wide range and the position of the brake pedal is varying in a wide range, the ambient condition monitoring system 20 infers that the vehicle is traveling in an urban district. The ambient condition monitoring system 20 determines selectively a monitoring mode according to the result of inference. For example, the ambient condition monitoring system 20 selects a wide range monitoring mode to monitor the condition of a wide monitoring range roughly when the vehicle is traveling on an expressway because the vehicle travels at a comparatively high traveling speed on an expressway. The ambient condition monitoring system 20 selects a narrow range monitoring mode to monitor the condition of a narrow monitoring range in detail when the vehicle is traveling in an urban district because the vehicle travels at a comparatively low traveling speed. The vehicle condition data storage unit 70 deletes the oldest data among those stored therein every time the vehicle condition monitoring system 10 provides new data to update the data stored therein.

Fourth Embodiment

Figure 8:
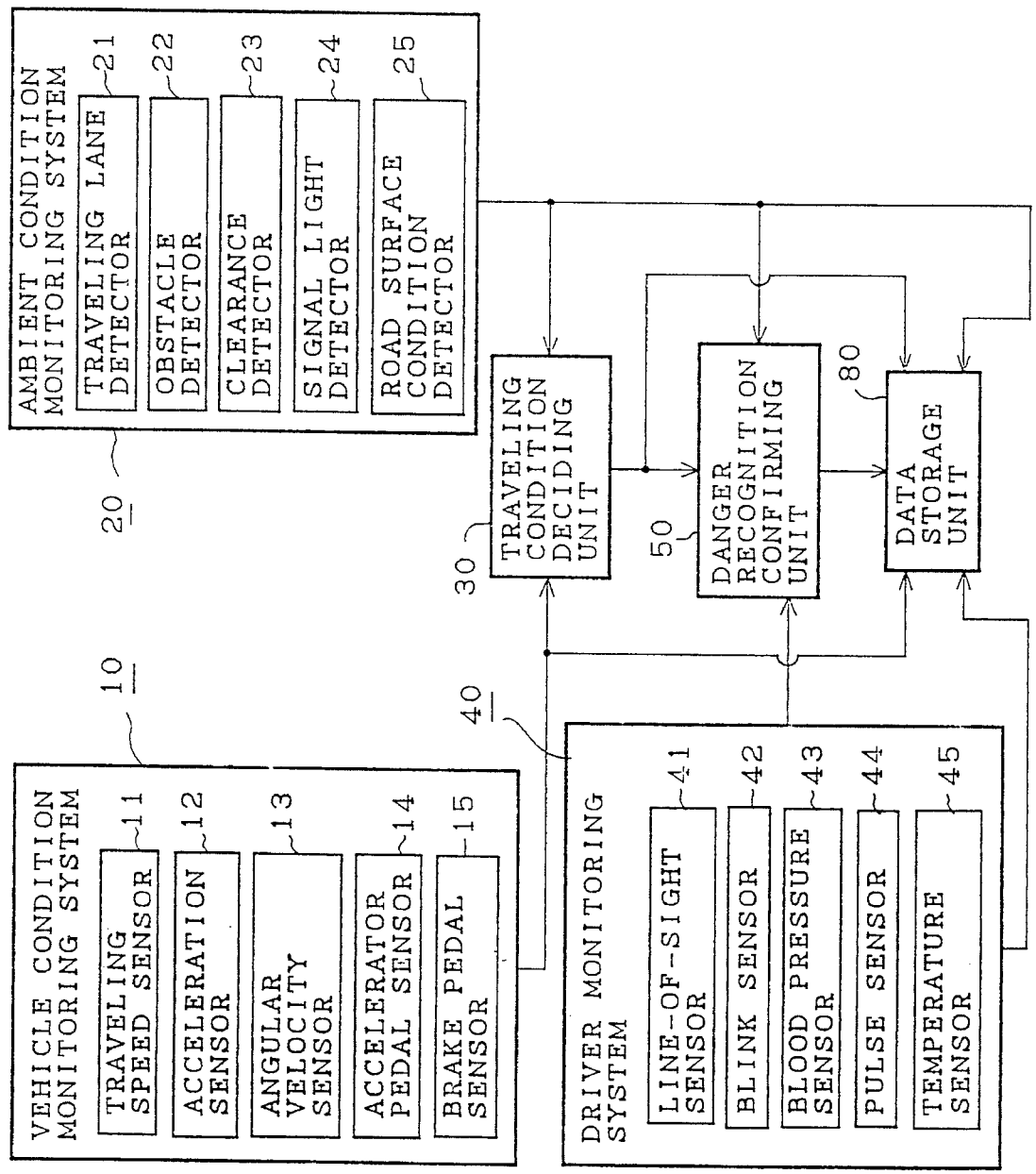
FIG. 8 is a block diagram of a danger avoidance system for a vehicle, in a fourth embodiment according to the present invention.

A danger avoidance system in a fourth embodiment according to the present invention will be described with reference to FIG. 8. As shown in FIG. 8, the danger avoidance system comprises a vehicle condition monitoring system 10, an ambient condition monitoring system 20, a traveling condition deciding unit 30, a driver monitoring unit 40, a danger recognition confirming unit 50, which are substantially the same in configuration and function as those of the foregoing embodiments, and a data storage unit 80. The data storage unit 80 stores data represented by the respective output signals of the vehicle condition monitoring system 10, the ambient condition monitoring system 20, the traveling condition deciding unit 30, the driver monitoring system 40 and the danger recognition confirming unit 50 in time series. The fourth embodiment is substantially the same in configuration and function as the first embodiment and differs from the first embodiment only in employing the data storage unit 80 instead of the danger avoidance effecting system 60 to store the data provided by the component systems and units in time series and in not effecting danger avoiding actions. Therefore, the detailed description of the operation of the danger avoidance system in the fourth embodiment will be omitted. The data stored in the data storage unit 80 can be applied to a drive simulator or an operations control apparatus for testing driver's aptitude for driving.

Although present invention has been described as applied to danger avoidance systems in which a vehicle condition monitoring system comprises a traveling speed sensor, an acceleration sensor, an angular velocity sensor, an accelerator pedal sensor and a brake pedal sensor, an ambient condition monitoring system comprises a traveling lane detector, an obstacle detector, a clearance detector, a signal light detector and a road surface condition detector, the driver monitoring system comprises a line-of-sight sensor, a blink sensor, a blood pressure sensor, a pulse sensor and a temperature sensor, and a danger avoidance effecting system comprises an audio warning device, a warning display, the steering wheel of the vehicle, the brake pedal of the vehicle and the accelerator pedal of the vehicle, naturally, the components of these systems need not be limited thereto.

What is claimed is:

1. A danger avoidance system for a vehicle comprising:
   a vehicle condition monitoring system for monitoring a behavior of the vehicle and for providing vehicle information;
   an ambient condition monitoring system for monitoring a condition of ambience surrounding the vehicle and for providing ambient information:
   a traveling condition deciding unit, receiving the vehicle information indicative of the behavior of the vehicle, and the ambient information indicative of the ambience of the vehicle, for deciding whether the vehicle is in a dangerous traveling mode based on the vehicle information and the ambient information, the traveling condition deciding unit having means for providing a first output if the vehicle is in the dangerous traveling mode;

a danger recognition confirming unit, receiving the first output and driver information indicative of behavior of a driver of the vehicle, for deciding, in response to the first output, whether the driver is aware of the dangerous traveling mode, the danger recognition confirming unit having means for providing a second output if the driver is unaware of the dangerous traveling mode;

a danger avoidance effecting unit, receiving the second output, for effecting warning actions to warn the driver of the dangerous traveling mode in response to the second output; and a vehicle condition data storage unit for storing data represented by output signals of the vehicle condition monitoring system for a predetermined time;

wherein the ambient condition monitoring system includes means for inferring the condition of the ambience surrounding the vehicle from the data stored in the vehicle condition data storage unit and includes means for selectively determining a monitoring range of the ambient information to be monitored by the ambient condition monitoring system in response to the inferred condition of the ambience.

2. The danger avoidance system according to claim 1, further comprising a driver monitoring system for monitoring the behavior of the driver and for providing the driver information.

3. The danger avoidance system according to claim 2, wherein the danger recognition confirming unit further receives the ambient information and decides whether the driver is aware of the dangerous traveling mode on the basis of outputs of the driver monitoring system and the ambient condition monitoring system.

4. The danger avoidance system according to claim 3, wherein the danger recognition confirming unit further receives the vehicle information for deciding whether the driver is aware of the dangerous traveling mode.

5. In a danger avoidance system for a vehicle having a vehicle condition monitoring system for monitoring behavior of the vehicle, an ambient condition monitoring system for monitoring a condition of ambience surrounding the vehicle, and a driver monitoring system for monitoring driver's behavior, the danger avoidance system comprising:

a traveling condition deciding unit for automatically deciding whether the vehicle is in a dangerous traveling mode on the basis of an output of the vehicle condition monitoring system and an output of the ambient condition monitoring system and having means for providing a first output if the vehicle is in the dangerous traveling mode;

a danger recognition confirming unit for automatically deciding, in response to receipt of the first output, whether the driver is aware of the dangerous traveling mode on the basis of an output of the driver monitoring system and having means for providing a second output if the driver is unaware of the dangerous traveling mode; and a data storage unit for storing data represented by the output of the vehicle condition monitoring system, the output of the ambient condition monitoring system, the first output, the output of the driver monitoring system and the second output in time series;

wherein the ambient condition monitoring system includes means for inferring the condition of the ambience surrounding the vehicle from the data represented by the output of the vehicle condition monitoring system stored in the data storage unit and includes means for selectively determining a monitoring range of the ambient information to be monitored by the ambient inferred condition on the ambience monitoring system in response to the condition.

6. A danger avoidance system for a vehicle, comprising:

vehicle condition monitoring means for monitoring a behavior of the vehicle and for providing vehicle information indicative of a condition of the vehicle:

ambient condition monitoring means for monitoring a condition of ambience surrounding the vehicle and for providing ambient information indicative of an ambience of the vehicle;

traveling condition means for deciding whether the vehicle is in a dangerous traveling mode based on an inference of the behavior of the vehicle including:
first vehicle information means for receiving the vehicle information indicative of a condition of the vehicle,
first ambient information means for receiving the ambient information indicative of an ambience of the vehicle,
vehicle behavior means for inferring the behavior of the vehicle based on the vehicle information and the ambient information, and
enabling means for providing an enabling signal when the vehicle is in a dangerous traveling mode;

recognition confirming means for deciding whether a driver is aware when the vehicle is in a dangerous traveling mode based on an inference of the awareness of the driver including:
means for receiving the enabling signal,
driver information means for receiving driver information indicative of behavior of the driver,
driver behavior means for inferring the awareness of the driver based on the driver information, and
warning means for providing a warning signal when the driver is unaware of the dangerous traveling mode and for inhibiting the warning signal when the driver is aware of the dangerous traveling mode; and danger avoidance means for providing warning actions to warn the driver of the dangerous traveling mode when the driver is unaware of the dangerous traveling mode including means for receiving the warning signal; and data storage means for storing data including the vehicle information indicative of the condition of the vehicle and the ambient information indicative of the ambience of the vehicle;

wherein the ambient condition monitoring means includes means for inferring the condition of the ambience surrounding the vehicle from data indicative of the condition of the vehicle stored in the vehicle condition data storage unit and means for selectively determining a monitoring range of the ambient information to be monitored by the ambient condition monitoring system in response to the inferred condition of the ambience.

7. The danger avoidance system according to claim 6 further comprising:

vehicle monitoring means for monitoring and transmitting the vehicle information, ambient monitoring means for monitoring and transmitting the ambience information, and driver monitoring means for monitoring and transmitting the driver information.

8. The danger avoidance system according to claim 7, wherein the recognition confirming means further includes a second ambient information means for receiving the ambient information, and wherein the driver behavior means infers the behavior of the driver based on the driver information and the ambient information.

9. A method for a vehicle to avoid danger, the method comprising the steps of;

(a) receiving vehicle data indicative of the vehicle;

(b) receiving ambient data indicative of ambience surrounding the vehicle;

(c) inferring the behavior of the vehicle based on an integration of the vehicle data and the ambience data;

(d) determining whether the vehicle is in a dangerous traveling mode based on the inference of the behavior of the vehicle;

(e) receiving driver data indicative of the behavior of the driver;

(f) inferring the behavior of a driver based on the driver data;

(g) determining whether the driver is aware of the dangerous traveling mode based on the inference of the behavior of the driver;

(h) if step (g) determines that the driver is unaware of the dangerous traveling mode, providing a warning to the driver;

(i) monitoring the vehicle to determine the vehicle data; and (j) monitoring the ambience surrounding the vehicle to determine the ambient data;

wherein the step (a) includes the steps of:

storing the vehicle data for a predetermined time:

inferring the ambience surrounding the vehicle based on the stored vehicle data; and selecting a monitoring range of the ambient data to be monitored based on the inference of the ambience surrounding the vehicle.

10. The method of claim 9 further comprising the step of (k) monitoring the driver to determine the driver data.

11. The method of claim 10 wherein step (f) infers the behavior of the driver based on the driver data and the ambient data.

* * * * *